United States Patent [19]

Matthews et al.

[11] Patent Number: 4,921,714
[45] Date of Patent: May 1, 1990

[54] COEXTRUDED MEAT BASED PRODUCT

[75] Inventors: Bernard T. Matthews, Norwich; David J. Joll, Holt; Habeeb M. Ziauddin; David N. Wilson, both of Norwich, all of England

[73] Assignee: Bernard Matthews PLC, Norfolk, England

[21] Appl. No.: 327,105

[22] Filed: Mar. 22, 1989

Related U.S. Application Data

[62] Division of Ser. No. 156,758, Feb. 18, 1988, Pat. No. 4,834,999.

[30] Foreign Application Priority Data

Jul. 1, 1987 [GB] United Kingdom ............... 8715409

[51] Int. Cl.$^5$ .................... A23L 1/31; A23L 1/317
[52] U.S. Cl. .................................. 426/90; 426/92; 426/105; 426/135; 426/641; 426/646
[58] Field of Search ............... 426/90, 92, 105, 129, 426/135, 284, 641, 413, 513, 516, 646

[56] References Cited

U.S. PATENT DOCUMENTS

| | | | |
|---|---|---|---|
| 3,551,161 | 12/1970 | Whitestone | 426/92 X |
| 3,959,503 | 5/1976 | Laugherty | 426/92 X |
| 4,407,830 | 10/1983 | Matthews et al. | 426/272 |
| 4,469,475 | 9/1984 | Krysiak | 425/132 |
| 4,481,872 | 11/1984 | Matthews et al. | 99/353 |
| 4,663,170 | 5/1987 | Matthews et al. | 426/90 |
| 4,721,622 | 1/1988 | Kingham et al. | 426/92 |
| 4,748,031 | 5/1988 | Koppa | 426/92 X |

FOREIGN PATENT DOCUMENTS 2221081 10/1974 France .
2469874 5/1981 France .
1510996 5/1978 United Kingdom .

Primary Examiner—Arthur L. Corbin
Attorney, Agent, or Firm—Oliff & Berridge

[57] ABSTRACT

The invention provides a meat-based product comprising a whole-muscle body A and a core B of stuffing. The stuffing contains cereal, herbs and spices and also a major proportion of a material, preferably fatty, to produce a thick viscous readily extrudable emulsion. The product also includes an outer casing D and an annular layer C of fat between the whole-muscle body A and the casing D. The product is made by coextrusion from a triple coextrusion head supplied with whole-muscle meat, stuffing formulation and the fatty material from separate hoppers.

2 Claims, 2 Drawing Sheets

COEXTRUDED MEAT BASED PRODUCT

This is a division of application Ser. No. 07/156,758 filed Feb. 18, 1988, now U.S. Pat. No. 4,834,999.

TECHNICAL FIELD

This invention relates to the production of an improved food product.

BACKGROUND ART

Specifically the invention is concerned with a coextruded product comprising a central body of whole-muscle meat, an outer layer, usually fatty, surrounding the whole-muscle body and an outer casing of plastics or similar non-toxic material. Whole muscle meat is meat from a dismantled carcass with the muscle scaffold network substantially intact. A process and apparatus for making this product is described in our E-P-A 0,024,790. The whole-muscle pieces are loaded into one hopper of a coextrusion device and fatty material into the other. The whole-muscle body and the outer fatty layer are coextruded into a casing dispensed from stock surrounding the extrusion head.

It should be appreciated that the whole-muscle pieces are often of substantial size so when compressed and generally distorted in the extrusion passages become highly energised. It is thus surprising that such energised material could be effectively coextruded into an elongate billet of consistent shape with the outer layer unbroken.

We are aware of multiple layer coextruded products in the prior art. Such processes can be exemplified by FR-A-2,274,221. Here a product, principally for confectionery purposes, comprises a cylindrical body 2 with an outer layer 1 and an inner core 3. This product is made of components which are homogenous or can readily be rendered so and as stated in E-P-A 0,024,790 the coextrusion of such materials does not present a problem.

SUMMARY

The present invention is concerned with the quite different and specialised application of the coextrusion of highly energised whole-muscle meat with an outer thick fluid layer. Thus the present invention is characterised by the coextrusion of a stuffing core through the whole-muscle body and by forming the said core of a material which incorporates the stuffing proper in a thick fluid, usually a fatty, base. We have now found, contrary to expectations, that it is possible to coextrude a coherent stuffing core of sufficiently even cross-section through the main whole-muscle body provided that the stuffing core is suitably constituted so as to be able to withstand the extrusion and to survive as a continuous core within the energized meat body.

BRIEF DESCRIPTION OF THE DRAWINGS

The invention will be more fully described by way of example with reference to the accompanying drawings wherein.

DESCRIPTION OF THE PREFERRED EMBODIMENTS

The word "stuffing" is used as in the meat cooking art to define a flavouring substance, usually of crumbly consistency, and based on bread crumbs or similar cereal, herbs and spices. In accordance with the present invention the stuffing proper may be incorporated into an emulsified base usually fatty in character. The emulsified base for the stuffing core can be similar to the emulsified formulation suitable for forming the outer fatty layer of the product. The stuffing base is thick, i.e. of high viscosity in the cool temperatures in which food processing is carried out. In fact the emulsified formulations in question are typically self-supporting to a considerable extent but become more fluid in the extrusion process.

Figure 1:
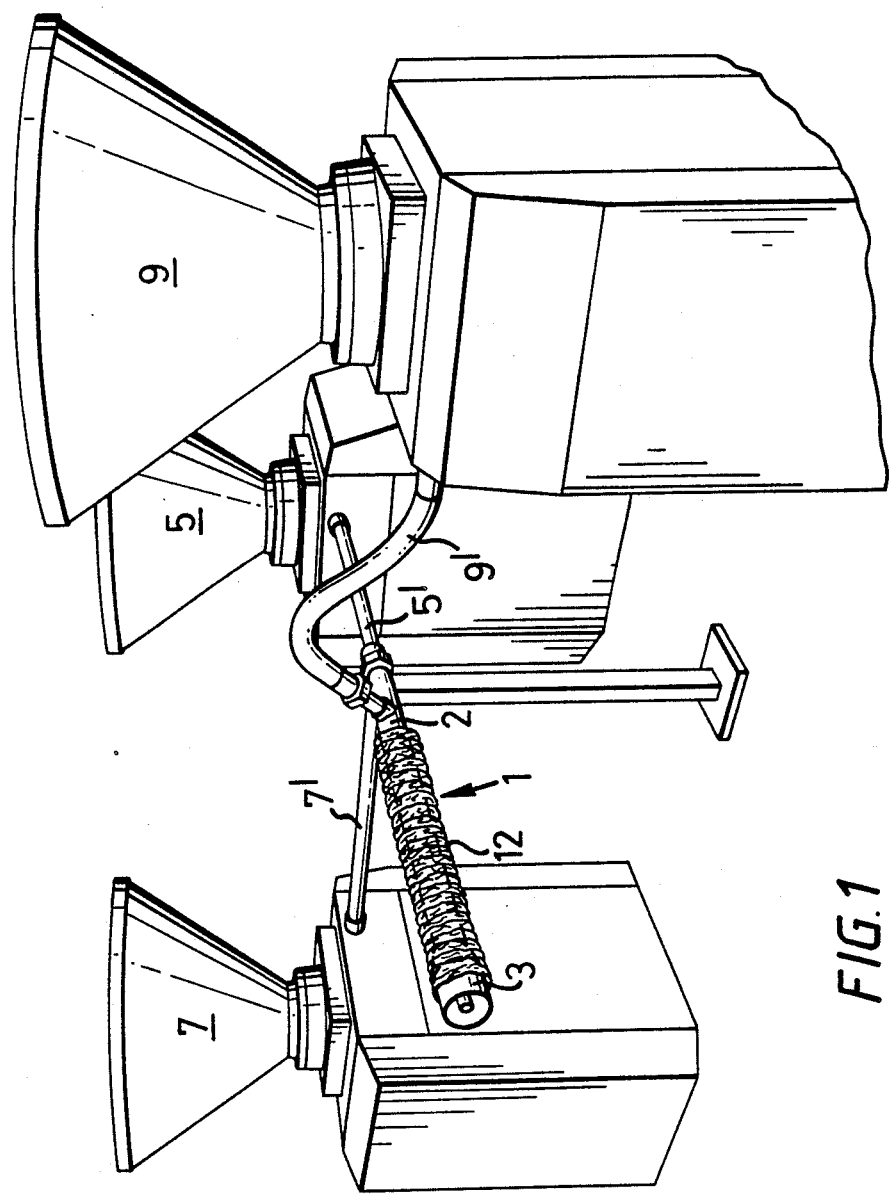
FIG. 1 is a schematic view of an apparatus for carrying out a process in accordance with the invention.

Referring initially to FIG. 1 of the drawings a coextrusion device 1 comprises a main body or mandrel 2 fed with the components to be extruded, and a coextrusion head 3. The mandrel, as can best be seen in FIG. 2, comprises a central or axial passage 4 fed from a hopper 5 through pipe 5' with core or stuffing material, a first annular passage 6 fed from a hopper 7 through pipe 7' with whole-muscle meat and an outer annular passageway 8 fed with fatty material from hopper 9 through pipe 9'. Each hopper includes a vane pump with adjustable delivery.

Figure 2:
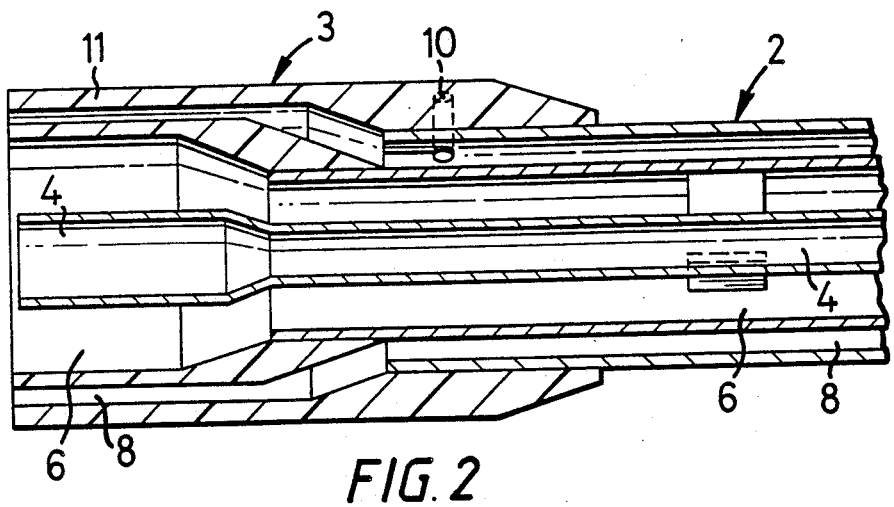
FIG. 2 is a section through the triple extrusion head.

The construction of the coextrusion head 3 can be appreciated from FIG. 2. The head in this embodiment is detachable and formed of plastics material detachably attached to the mandrel by a bolt 10.

In accordance with E-P-A 0,024,790 the front end part 11 of the extrusion head 3 is laterally enlarged allowing a widening of the passage 6 containing the meat with a corresponding constriction of the passage 8 through which the fatty emulsion flows. A further feature of the invention resides in the widening in the extrusion head of the axial passage 4 for the stuffing. In the embodiment illustrated the stuffing passage is an extension of the mandrel 2 rather than part of the extrusion head 3. The widening of passage 4 and the outer surface of the pipe defining it have a smooth gradual profile; this configuration allows the whole-muscle meat the maximum space and the minimum of obstruction possible within the supply mandrel.

As can be seen in FIG. 1 there is threaded onto the outside of the extrusion device 1 a flexible sleeve 12 of transparent non-toxic sheet material.

Figure 3:
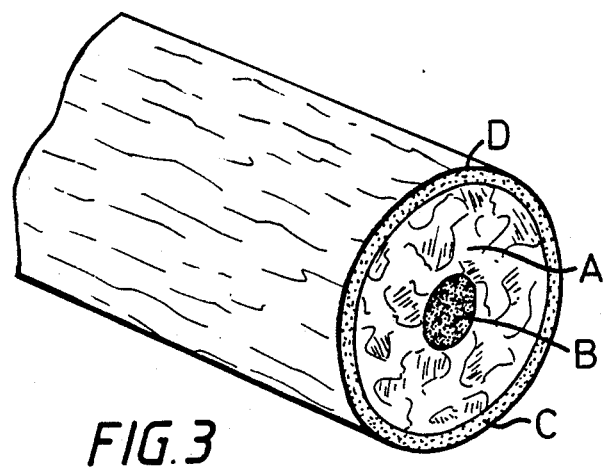
FIG. 3 shows a product in accordance with and manufactured by the process of the invention.

In use hopper 7 is filled with whole-muscle meat, hopper 9 with a fatty emulsion and hopper 5 with a "stuffing" formulation. The casing is closed and clipped at the front of the extrusion head and the three pumps operated so that the extrudate shown in FIG. 3 is discharged forwardly. This operating procedure is as described in E-P-A 0,024,790 as are the subsequent arrangements for catching, conveying and freezing the coextrudate. Thus the coextrusion continues until a desired length has been achieved. The coextrudate is then severed and casing clipped at the rear and this clipping operation clips the front of the next emerging casing.

The stuffing formulation for the process in accordance with the invention comprises essentially two components, (a) the stuffing proper, and (b) a viscous emulsion base. A typical formulation is:

| | |
|---|---|
| Chopped meat approximately half fat and half lean | 50% |
| Water | 34% |
| Stuffing proper | 15% |
| Salt | 1% |

The stuffing proper is made up principally of bread crumbs with small flavouring amounts of herbs and spices such as sage, thyme, pepper etc.

The mixture including the stuffing proper, the chopped meat and extender is emulsified into a thick fluid viscous consistency in a suitable device such as a bowl chopper. The techniques and apparatus for emulsifying chopped meat and extenders are known in the food processing industry.

The relative proportions of emulsion base meat and extenders (b) to stuffing proper (a) 85 to 15% are typical. One may regard 80 to 90% emulsion base to 10 to 20% stuffing as being preferred ranges.

FIG. 3 illustrates a novel product in accordance with the invention being a length of coextrudate. The product comprises a main body A of whole-muscle meat surrounding a central axially extending core B of a stuffing formulation as set out above. The meat body A is surrounded by a fatty annulus C and then in turn by an outer casing D. As before this product is designed to be cooked in the casing axis upright. The stuffing core is able to maintain its extruded form and be retained during freezing, thawing and cooking to the plate so that slices of the meat product, though quite thin, retain a stuffing core. The core B is shown in an idealised circular cross section. In practice the dynamic interaction between whole-muscle meat and stuffing tends to produce a more irregular shape.

We claim:

1. A whole-muscle meat product comprising an inner body of whole-muscle meat, an annular outer layer of fatty material coextruded around said inner body, a flexible outer casing enclosing said outer layer and a continuous inner stuffing core coextruded through said inner body and comprised of stuffing worked into a thick fluid formulation in admixture with a fatty base.

2. A food product according to claim 1 wherein the stuffing core is a thick emulsified formulation comprising from 10 to 20% of a stuffing mixture of cereal and spices and from 80 to 90% of a base chopped meat and extenders.

* * * * *